March 9, 1965 P. J. W. JOCHEMS ETAL 3,172,785

METHOD OF MANUFACTURING TRANSISTORS PARTICULARLY
FOR SWITCHING PURPOSES

Filed Jan. 25, 1961

INVENTORS
PIETER J. W. JOCHEMS
OSCAR W. MEMELINK
BY
AGENT

United States Patent Office 3,172,785

Patented Mar. 9, 1965

3,172,785

METHOD OF MANUFACTURING TRANSISTORS PARTICULARLY FOR SWITCHING PURPOSES

Pieter Johannes Wilhelmus Jochems and Oscar Willem Memelink, both of Eindhoven, Netherlands, assignors to North American Philips Company, Inc., New York, N.Y., a corporation of Delaware Filed Jan. 25, 1961, Ser. No. 84,798
Claims priority, application Netherlands, Jan. 30, 1960, 247,918
2 Claims. (Cl. 148—1.5)

Figure 1:
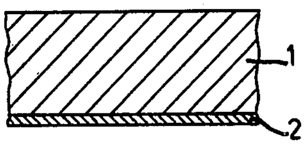

The invention relates to a method of manufacturing a transistor particularly for switching purposes, this transistor comprising a semi-conductive body having a collector, a base and an emitter zone, which zones are provided wtih collector, base and emitter contacts, which body contains one or more impurities reducing the lifetime of the charge carriers.

In a frequently employed transistor arrangement, the disadvantage may occur that certain transitional phenomena, frequently termed "storage effects," are involved, when the transistor is brought from the "on" state into the "off" state. In the "on" state the junction between the collector and the base zone is traversed in the forward direction by current, which involves a strong injection of charge carriers into the collector zone. Before the reversed switching state, i.e. the "off" state, can be attained, these charge carriers must be removed.

The lifetime of these charge carriers may be reduced by adding given impurities, also termed "killers," to the semiconductive material. With germanium use may to this end be made, for example, of iron, nickel, copper and gold. For the manufacture of high-speed diodes this means is frequently used, but with the manufacture of transistors the difficulty arises that, in order to attain a high amplification, a long lifetime of the charge carriers is required, at least in the base zone and particularly in that part thereof which is located between the emitter and the collector zone.

On different principles, i.e. for obtaining transistors or diodes having a low temperature dependence, it is already known to add similar impurities, for example, nickel, cobalt, iron and gold, to the semi-conductive material (see French patent specification 1,161,272), So far as they reduce the lifetime of the charge carriers that prevail in the base zone, they will diminish the amplification factor of transistors. In neither of these two cases the manner in which the various zones and contacts are formed plays an essential role with respect to the effect of the said so-called "killers."

The invention is based on the recognition of the fact that the use of such essentially useful impurities need not involve serious disadvantages, if it is possible to render their concentration in the base zone very small, particularly in that part thereof which is located between the emitter and the collector zone so that the storage effects may be reduced to a large extent without diminishing the amplification factor to a serious extent. It is furthermore based on the recognition of the fact that this can be achieved by taking particular steps in applying the emitter and/or the base contact and in the formation of the emitter and/or the base zone.

Before going over to the description of the invention itself, it should be noted that many methods are known for the formation of the semi-conductive zones and the application of contacts. Initially point contacts were used for the formation of transistors. Then contacts were fused onto the semi-conductive body, which contacts consisted of alloys containing certain impurities. During the fusing process part of the semi-conductive material was dissolved, which material crystallized out upon cooling and then assumed, owing to the presence of the said impurities, a conductivity type opposite that of the body. A further known method consists in that crystals are drawn up from a melt so that thin zones of a given conductivity type are formed therein between two zones of opposite conductivity type. By sawing out small bodies and by applying contacts many transistors can be made from one large crystal. It is furthermore known, particularly with the so-called "surface barrier transistors," to apply very thin contacts by electro-plating which contacts may, if desired, be subjected in addition to an alloying process. Contacts may furthermore be applied by bonding wires under a high pressure, at a temperature below the eutectic of the materials to be united, against the semi-conductive body. It is also known to form a base zone on the surface of a semi-conductive body by a separate diffusion process, an emitter and a base contact being applied thereto afterwards, for example, by alloying. Finally there is known a method in which simultaneously with the alloying of emitter- and/or base-contact material a diffused base zone is formed by the presence of an impurity suitable for the formation of the diffusion zone. With germanium, arsenic and antimony are very suitable to this end, and with silicon, aluminum, indium and gallium may be used successfully. Usually these strongly diffusing impurities are previously added to the alloy material, but as an alternative, they may be provided separately in the space in which the alloying process is carried out. This has been described in the June 1958 issue of IRE Proceedings, vol. 46, pages 1161–1165.

The invention is furthermore based on the recognition of the fact that with the last-mentioned method for the manufacture of transistors a purifying effect may be obtained with respect to those parts of the semi-conductive body which are located in the neighborhood of the fused contact material, i.e. as far as impurities are concerned, which occur in the body but not in the contact material, since, particularly with this method, the contact material is in contact with the semi-conductive body for a comparatively long time at a comparatively high temperature required to obtain the diffused base layer, which conditions are therefore also capable of furthering a migration of impurities out of the body into the contact material.

The invention therefore relates to a method as defined above for the manufacture of a transistor, in which impurities reducing the lifetime of the charge carriers are contained in the semi-conductive body, and is characterized in that at least that part of the base zone which is located between the emitter and the collector zone is formed by simultaneously fusing an emitter-contact material and diffusing an impurity reversing the conductivity type of the semi-conductive body, at least into the area below the said contact material where it forms a diffused base zone, while use is made of a contact material which is substantially free of the said impurities reducing the lifetime of the charge carriers.

The latter term is to be understood to mean that the concentration ($C_{k,1}$) of these impurities or "killers" in the molten contact material is lower than the concentration ($C_{k,s}$) of the "killers" in the surface portion of the semi-conductive body covered by the contact material, divided by the distribuiton coefficient $k$ of the impurity concerned between the melt concerned and the solid substance. This condition, which may be written as follows:

$$C_{k,1} < \frac{1}{k} C_{k,s}$$

means, in fact, that the concentration of the impurities in the electrode material is so small that the impurities travel from the solid substance into the melt. With the conventional impurities of this type, for example, iron, nickel, gold and copper, the factor $k$ is so low that the said condition can be readily fulfilled.

It should be noted that it is not essential for the invention whether the concentration of the "killers" in the semi-conductive body, to which the method is applied, is homogeneous, since the effect of the method concerns in the first place the region the base zone is formed between the emitter- and the collector-zone.

It is furthermore pointed out that the condition that the semi-conductive body should have an emitter-, a base- and a collector-zone, is not to be considered as a limitation; the body may comprise, in addition, other zones, which is, for example, the case with npnp-transistors. The part of the base zone located between the emitter- and the collector-zone has preferably a thickness of not more than 0.1μ. Otherwise this thickness is preferably not more than 2μ, in order to perform an effective withdrawal of the "killers" from this part of the base zone.

If the semi-conductive body consists of germanium—which, of course, does not mean that the material may not contain impurities such as conductivity type defining impurities—preferably one of the elements gold, iron, nickel or copper are used as impurities or "killers" reducing the lifetime. In this case use is preferably made of arsenic and/or antimony as impurities producing the base layer by diffusion. If the body consists of silicon, iron and/or gold may be used, preferably, as "killers" and one or more of the elements aluminum, indium or gallium as the impurity producing the base layer by diffusion.

The invention will now be described more fully with reference to one embodiment, which is illustrated in the drawing.

FIGURES 1 to 4 illustrate various stages of the manufacture of a transistor, in a diagrammatical and sectional view; particularly the tin layers are shown on an extremely enlarged scale.

The starting material may be, for example, a germanium disc 1 (see FIG. 1) of 200μ in thickness of p-type conductivity, having a resistivity of 1 ohm-cm. To one side is applied by vaporisation a layer of gold 2 of a thickness of 0.3 to 0.4μ, which is caused to diffuse into the material of the disc by heating at 800° C., for four hours, in hydrogen. The gold layer 2 alloys with the germanium and disappears partly by diffusion. As an alternative, use may be made of a disc sawed from a germanium body doped as a whole with a "killer," for example gold.

Figure 2:
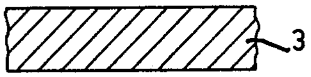

Then the top part of the disc is etched away down to a thickness of 100μ, in order to exclude completely any surface impurities (see FIG. 2).

To the disc thus obtained, now designated by 3, are applied two quantities of contact material, shaped in the form of pellets of 150μ in diameter, spaced by a distance of 40μ. These pellets consists of alloys of lead with 5% by weight of antimony and about 1% by weight of aluminum, and lead with 5% by weight of antimony, respectively. The contacts contain no gold, thus fulfilling the concentration described above.

Figure 3:
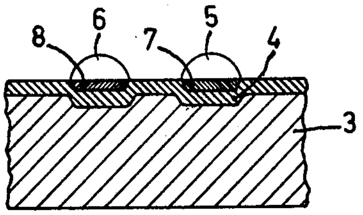
Figure 4:
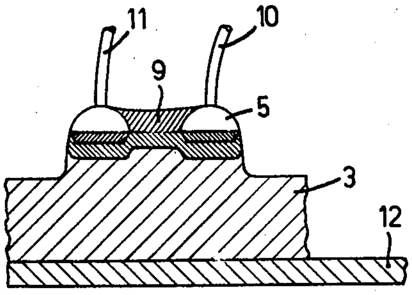

By a heating process in hydrogen at a temperature of about 750° C., for 6 minutes, the contact material is alloyed (see FIG. 3). Thus the antimony diffuses out of this material into the surface of the p-conductice disc, where it constitutes a base zone 4 of about 1μ in thickness. This layer 4 covers the whole disc and extends also below the contacts 5 and 6, as is illustrated in FIG. 3 on an enlarged scale. During the alloying process germanium is dissolved in the contact material and during cooling it segregates and constitutes, below the contacts 5 and 6, two segregated or recrystallized layers 7 and 8, of which the first (7) is n-conductive owing to its antimony content and the second (8) is p-conductive owing to the greater solubility of aluminum in germanium. The layer 8 thus constitutes the emitter zone, whereas the parts 4 and 7 constitute the base zone.

During this diffusion process a small quantity of gold will travel from the close neighborhood of the contact in a direction opposite that of the diffusing antimony, so that the harmful effect of this "killer" in the base zone is at least partly reduced. This rather short diffusion process necessary to build up the thin diffused base layer 4 proved to be sufficient to reduce the concentration of killers in marked extent.

It is important in this case, in particular, that the "killers" are drawn away from that part of the base zone 4 which is located between the emitter zone 8 and the collector zone. The collector zone is formed by that part of the disc 3 which is located underneath the layer 4.

Finally, a masking substance 9, for example lacquer, is applied between the contacts 5 and 6 after the latter have been provided with supply wires 10 and 11 and after the disc 3 has been soldered onto a collector contact 12, for example, with the aid of indium containing a small quantity of gallium. The part surrounding the contacts 5 and 6 and lying at the surface of the disc 3 is then etched off (see FIG. 4).

In the above example, the killers will be out diffused into both contacts 5 and 6, though of course the removal of the killers from the base underlying the emitter contact 6 is considered important. There remain killers in the base layer especially in the region between the contacts 5 and 6; but this part of the base layer is not active with respect to the injection of charge carriers, so that the presence of killers here does not affect the amplification.

Thus a transistor is obtained which exhibits not only an acceptable amplification factor and a low collector-base leakage current but also the suppression of "storage phenomena" required in high-speed arrangements.

What is claimed is:

1. A method of manufacturing an alloy-diffused transistor adapted for switching purposes, comprising diffusing into a semiconductor body of one-type conductivity impurities for reducing the lifetime of charge carriers therein and selected from the group consisting of gold, iron, nickel and copper, a portion of said body being adapted to constitute a collector zone of the transistor, fusing to a surface of said body opposite to said collector zone a contact-forming material comprising lead and including an active impurity capable of forming said one-type conductivity in a concentration producing in the body when solidified a recrystallized emitter zone of said one-type conductivity and also including an active impurity having a high diffusion coefficient and capable of reversing the conductivity type of the adjacent body portions when the latter impurity is diffused therein, said contact-forming material being substantially free of the said lifetime-reducing impurities, maintaining the contact-forming material on the body in a fused state for a time sufficiently long to cause the diffusing active impurity to diffuse from the contact-forming material into the body to form a base region of opposite-type conductivity with a thickness between 0.1 and 2 microns and simultaneously to cause lifetime-reducing impurities at least in the said base region between the emitter zone and collector zone to outdiffuse from the body into the said contact-forming material, cooling the assembly to solidify the contact-forming material and form the emitter zone adjacent the base region, and providing electrical contacts to the emitter zone, the base region, and the collector zone.

2. A method as set forth in claim 1, wherein the semiconductor body is of germanium, the lifetime-reducing impurities are of gold, and the diffusing active impurity is selected from the group consisting of arsenic and antimony.

References Cited by the Examiner

UNITED STATES PATENTS

| | | | |
|---|---|---|---|
| 2,813,233 | 11/57 | Shockley | 148—1.5 X |
| 2,964,689 | 12/60 | Buschert et al. | 148—1.5 X |
| 3,074,826 | 1/63 | Tummers | 148—1.5 |

OTHER REFERENCES

Jochems et al.: "Construction and Electrical Properties of a Germanium Alloy-Diffused Transistor," Proceedings of the IRE, June 1958, pp. 1161–1165.

DAVID L. RECK, *Primary Examiner.*

MARCUS U. LYONS, *Examiner.*